(12) United States Patent
Shepherd et al.

(10) Patent No.: US 7,154,689 B1
(45) Date of Patent: Dec. 26, 2006

(54) APPARATUS FOR WRITING SERVO BURSTS ON A DISK WITH SERVO TRACK PITCH BASED ON READ ELEMENT WIDTH AND METHODS OF MANUFACTURING SAME

(75) Inventors: Stanley H. Shepherd, Morgan Hill, CA (US); Yu Sun, Fremont, CA (US); Lin Guo, Milpitas, CA (US); John VanLaanen, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 12 days.

(21) Appl. No.: 10/945,371

(22) Filed: Sep. 20, 2004

Related U.S. Application Data

(60) Provisional application No. 60/542,649, filed on Feb. 5, 2004.

(51) Int. Cl.
*G11B 5/09* (2006.01)
(52) U.S. Cl. .................. 360/48; 360/75; 360/77.08
(58) Field of Classification Search ............... None
See application file for complete search history.

(56) References Cited

U.S. PATENT DOCUMENTS

| | | | | |
|---|---|---|---|---|
| 4,608,618 A | * | 8/1986 | Sturtevant-Stuart | 360/135 |
| 5,668,679 A | | 9/1997 | Swearingen et al. | 360/75 |
| 6,052,250 A | * | 4/2000 | Golowka et al. | 360/77.08 |
| 6,256,160 B1 | * | 7/2001 | Liikanen et al. | 360/48 |
| 6,304,407 B1 | | 10/2001 | Baker et al. | 360/75 |
| 6,510,752 B1 | * | 1/2003 | Sacks et al. | 73/865.9 |
| 6,885,514 B1 | * | 4/2005 | Codilian et al. | 360/31 |
| 6,957,379 B1 | * | 10/2005 | Patapoutian et al. | 714/774 |

FOREIGN PATENT DOCUMENTS

JP 2000298807 A * 10/2000

* cited by examiner

*Primary Examiner*—Andrea Wellington
*Assistant Examiner*—Dan I Davidson
(74) *Attorney, Agent, or Firm*—Myers Bigel Sibley & Sajovec, PA

(57) ABSTRACT

Methods for making a disk drive, apparatus for writing servo bursts on a disk, and disk drive apparatus are provided. The disk drive includes a disk and transducer adjacent to the disk. The transducer includes a read element and a write element. A width of the read element is determined. A servo track pitch is determined based on the read element width. Servo bursts are written in servo tracks on the disk with the write element based on the servo track pitch.

21 Claims, 9 Drawing Sheets

APPARATUS FOR WRITING SERVO BURSTS ON A DISK WITH SERVO TRACK PITCH BASED ON READ ELEMENT WIDTH AND METHODS OF MANUFACTURING SAME

RELATED APPLICATION

This application claims the benefit of and priority to U.S. Provisional Patent Application No. 60/542,649, filed Feb. 5, 2004, the disclosure of which is hereby incorporated herein by reference as if set forth in its entirety.

FIELD OF THE INVENTION

The present invention relates to disk based storage devices and, more particularly, to writing servo bursts and data on disks.

BACKGROUND OF THE INVENTION

A disk drive system is a digital data storage device that stores information within tracks on a storage disk. The storage disk may, for example, include a magnetic, an optical, or a magneto-optical material that is capable of storing data. During operation of the disk drive, the disk is rotated about a central axis. To read data from or write data to the disk, a magnetic transducer is positioned above a desired track of the disk while the disk is spinning.

A conventional magnetic disk drive, generally designated 10, is illustrated in FIG. 1. The disk drive includes a storage disk 12 that is rotated by a spin motor 14. The spin motor 14 is mounted to a base plate 16. An actuator arm assembly 18 is also mounted to the base plate 16.

The actuator arm assembly 18 includes a transducer 20 (i.e., head) mounted to an actuator arm 22 that can rotate about a bearing assembly 26. The actuator arm assembly 18 includes a voice coil motor (VCM) 28, which moves the transducer 20 relative to the disk 12. The spin motor 14, VCM 28 and transducer 20 are coupled to a number of electronic circuits 30 mounted to a printed circuit board 32. The electronic circuits 30 typically include one or more read channel chips, a microprocessor-based controller and a random access memory (RAM), among other components.

Instead of having a single disk 12 as shown in FIG. 1, as is well-known in the art, the disk drive 10 may include a plurality of disks 12. In such case, each of the plurality of disks 12 may have two sides, with magnetic storage, optical storage, and/or magneto-optical storage material on each of those sides. Therefore, the disk drive 10 can include a plurality of actuator arm assemblies 18, each of the assemblies 18 being adjacent to a different recordable side of the plurality of disks, and configured to read and/or write data thereon.

Referring now to FIG. 2, data is stored on the disk 12 within a number of concentric tracks 40 (or cylinders). Each track is divided into a plurality of sectors 42. Each sector 42 is further divided into a servo region 44 and a data region 46.

The servo regions 44 of the disk 12 are used to, among other functions, accurately position the transducer 20 so that data can be properly written onto and/or read from the disk 12. The data regions 46 are where non-servo related data (i.e., user data) is stored and/or retrieved. Such data, upon proper conditions, may be overwritten.

FIG. 3 shows portions of tracks 40 for the disk 12 drawn in a straight, rather than arcuate, fashion for ease of depiction. An X-axis indicates a tangential direction along the tracks, and a Y-axis indicates a radial direction relative to the tracks. To accurately write data to and/or read data from the data region 46 of the disk 12 (see FIG. 2), it is desirable to maintain the transducer 20 in a relatively fixed position with respect to a given track's centerline 48 during each of the writing and reading procedures. Tracks n–2 through n+1, including their corresponding centerlines 48, are shown in FIG. 3.

To assist in controlling the position of the transducer 20 relative to the track centerline 48, the servo region 44 includes, among other information, servo information in the form of servo patterns 50 that can include one or more groups of servo bursts, as is well-known in the art. First, second, third and fourth servo bursts 52, 54, 56, 58 (commonly referred to as A, B, C and D servo bursts, respectively) are shown in FIG. 3. The servo bursts 52, 54, 56, 58 are accurately positioned relative to the centerline 48 of each track 40. Unlike information in the data region 46, servo bursts 52, 54, 56, 58 may not be overwritten or erased during normal operation of the disk drive 10.

As the transducer 20 is positioned over a track 40 (i.e., during a track following procedure), it reads the servo information included in the servo regions 44 of the track 40, one servo region 44 at a time. The servo information is used to, among other things, generate a position error signal (PES) as a function of a misalignment between the transducer 12 and a desired position relative to the track centerline 48. As is well-known in the art, the PES signals are input to a servo control loop (not shown) which performs calculations and outputs a servo compensation signal which controls the VCM 28 to, ideally, place the transducer 12 at the desired position relative to the track centerline 48.

Although the servo region 44 and data region 46 are shown in FIG. 3 as having a common track centerline 48, they may have different track centerlines, such that the transducer 20 is moved a predetermined distance from one of the track centerlines of the servo region 44 to be positioned over one of the track centerlines of the data region 46.

A servo track writer (STW) can be used to write servo regions 44, including their corresponding fields, onto the surface(s) of the disk 12 during the manufacturing process. The STW controls the transducers 20 corresponding to each disk surface of the disk drive system 10 to write the servo regions 44. In order to precisely write the servo regions 44 at desired locations on the disk 12, the STW directs each transducer 20 to write in small steps, with each step having a width (i.e., STW step width 72 as shown in FIG. 3). FIG. 3 illustrates the relationship between the STW step width 72 and the pitch 74 of the servo region 44 for a conventional disk drive system.

As used herein, the term "pitch" is the radial distance between centers of adjacent regions on the surface of a disk 12. For example, a servo track pitch 74 (shown in the data region 46 of FIG. 3) is the distance between the centers of radially adjacent servo regions 44. In contrast, the term "width" is defined as the radial distance from one end to the other end of a single region. For example, a servo track width 75 (shown in the data region 46 of FIG. 3) is the width from one end to another of a single servo region 44.

For each servo region 44, the servo track pitch 74 is generally equivalent to the servo track width 75. However, for data regions 46, the data track pitch 76 is generally different from the actual data track width (not shown) due to, for example, the presence of erase bands which are typically found on both sides of each data region 46. For simplicity, the effects that reduce the data track width are not shown in the figures. Instead, the data track width is shown to be the same as the data track pitch.

The servo track pitch can be based on an expected upper-range of the head geometry for a type of disk drive, and may be stored within a STW for use in writing the servo regions 44 within that type of disk drive. The continuing need for higher capacity disk drives continues to drive a demand for smaller geometry heads. However, present manufacturing techniques may result in an increased geometry variability between manufactured heads as the heads are made smaller. Such head geometry variability can cause a reduction in the manufacturing yield of the heads, and/or may cause a reduction in the operation and/or performance of the disk drives.

SUMMARY OF THE INVENTION

Some embodiments of the present invention provide a method of making a disk drive that includes a disk and a transducer adjacent to the disk. The transducer includes a read element and a write element. A width of the read element is determined. A servo track pitch is determined based on the read element width. Servo bursts are written in servo tracks on the disk with the write element based on the servo track pitch.

In some further embodiments of the present invention, the width of the read element is determined by writing a spiral pattern on the disk with the write element, reading at least a portion of the spiral pattern with the read element to generate a read signal envelope, and determining the read element width based on the read signal envelope. The spiral pattern may be written at a slew rate, and the read element width may be determined based on the slew rate and based on an elapsed time between two values in the read signal envelope that satisfy a predetermined relationship. The read element width may be determined based on an elapsed time between a peak value and a minimum value in the read signal envelope.

In some further embodiments of the present invention, a width of the write element is determined, a data track pitch is determined based on the write element width, and data tracks are written on the disk with the write element based on the data track pitch. The width of the write element may be determined by writing a spiral pattern on the disk with the write element, reading at least a portion of the spiral pattern with the read element to generate a read signal envelope, and determining the write element width based on the read signal envelope. The spiral pattern may be written at a slew rate. The write element width may be determined based on the slew rate and based on an elapsed time between two values in the read signal envelope that satisfy a predetermined relationship. The data track pitch may be adjusted by writing data patterns with the write element in a plurality of adjacent data tracks on the disk based on the data track pitch, reading with the read element at least a portion of the data patterns to generate read data, determining a bit error rate and/or an off-track read capability based on the read data, and adjusting the data track pitch based on the bit error rate and/or the off-track read capability. A plurality of adjacent data tracks may be written on the disk based on the adjusted data track pitch.

In some further embodiments of the present invention, the width of the read element is determined by writing a burst mark on the disk with the write element, trimming a portion of the burst mark with the write element, reading the trimmed burst mark with the read element to generate a read signal envelope, and determining the read element width based on the read signal envelope. A position of the transducer may be determined while writing the burst mark, a position of the transducer may be determined while reading the trimmed burst mark, and the read element width may be determined based on the read signal envelope and based on the determined positions of the transducer while writing the burst mark and while reading the trimmed burst mark. The trimming of portion(s) of the burst mark, reading the trimmed burst mark, and determining the read element width may be repeated until a peak value of the read signal envelope decreases a threshold amount from a previously generated read signal envelope. The method may be embodied in a computer program product.

Some embodiments of the present invention provide an apparatus for writing servo bursts on a disk. The apparatus includes a transducer having a read element and a write element, and a controller. The controller is configured to determine a width of the read element, to determine a servo track pitch based on the read element width, and to write servo bursts in a servo tracks on the disk based on the servo track pitch.

In some further embodiments of the present invention, the controller may include a servo track writer controller and/or a disk drive controller. The controller may be configured to write a spiral pattern on the disk with the write element, configured to read at least a portion of the spiral pattern with the read element to generate a read signal envelope, and configured to determine the read element width based on the read signal envelope. The controller may be configured to write the spiral pattern at a slew rate, and configured to determine the read element width based on the slew rate and based on an elapsed time between two values in the read signal envelope that satisfy a predetermined relationship, such as based on an elapsed time between a peak value and a minimum value in the read signal envelope.

In some further embodiments of the present invention, the controller may be configured to determine a width of the write element, to determine a data track pitch based on the write element width, and to write data tracks on the disk with the write element based on the data track pitch. The controller may be configured to write a spiral pattern on the disk with the write element, to read at least a portion of the spiral pattern with the read element to generate a read signal envelope, and to determine the write element width based on the read signal envelope. The controller may write the spiral pattern on the disk at a slew rate, and determine the write element width based on the slew rate and based on an elapsed time between two values in the read signal envelope that satisfy a predetermined relationship.

In some further embodiments of the present invention, the controller may be configured to write data patterns with the write element in a plurality of adjacent data tracks on the disk based on the data track pitch, to read with the read element at least a portion of the data patterns to generate read data, to determine a bit error rate based on the read data, to adjust the data track pitch based on the bit error rate, and to write a plurality of adjacent data tracks on the disk based on the adjusted data track pitch.

In some further embodiments of the present invention, the controller may be configured to write a burst mark on the disk with the write element, to trim a portion of the servo burst with the write element, to read the trimmed servo burst with the read element to generate a read signal envelope, and to determine the read element width based on the read signal envelope. The controller may be configured to determine a position of the transducer while writing the burst mark, to determine a position of the transducer while reading the trimmed burst mark, and to determine the read element width based on the read signal envelope and based on the determined positions of the transducer while writing the burst mark and while reading the trimmed burst mark. The controller may be configured to repeat the trimming portion(s) of the burst mark, reading the trimmed burst mark, and determining the read element width until a peak value of the read signal envelope decreases a threshold amount from a previously generated read signal envelope.

Some embodiments of the present invention provide a disk drive apparatus that includes a plurality of disks and a plurality of transducers. Each of the disks has recorded thereon servo bursts in servo tracks having a servo track pitch, and data tracks having a data track pitch. Each of the transducers includes a read element and a write element, and is adjacent to a different one of the plurality of disks and configured to read and write data thereon. The servo track pitch of each of the disks is proportional to a width of the read element of the adjacent one of the transducers.

In some further embodiments of the present invention, the servo track pitch of each of the data disks is proportional to a width of the write element of an adjacent one of the transducers. The apparatus may further include a controller that is configured to determine a width of the read element of each of the transducers, to determine the servo track pitch for each of the disks based on the width of the read element of an adjacent one of the transducers, and to write the servo bursts with the servo track pitch determined for each of the disks. The data track pitch of each of the disks may be proportional to a width of the write element on an adjacent one of the transducers. The controller may be configured to determine a width of the write element of each of the transducers, to determine the data track pitch for each of the disks based on the width of the write element of an adjacent one of the transducers, and to write data within the data tracks at the data track pitch determined for each of the disks.

Accordingly, the servo track pitch and the data track pitch for each major recordable surface of each of the disks can be based on, and may be proportional to, the respective widths of the read element and the write element of the adjacent one of the transducers, and can vary from one to another of the disks. Consequently, more variability in head geometry (i.e., variation in widths of read and write elements of transducers in a disk drive) may be accommodated and compensated, such that head manufacturing yield may be increased and/or the operation and/or performance of the disk drive may be improved.

The details of one or more embodiments of the invention are set forth in the accompanying drawings and the description below. Other features and advantages of the invention will be apparent from the following description, drawings and claims.

DETAILED DESCRIPTION OF THE INVENTION

Figure 1:
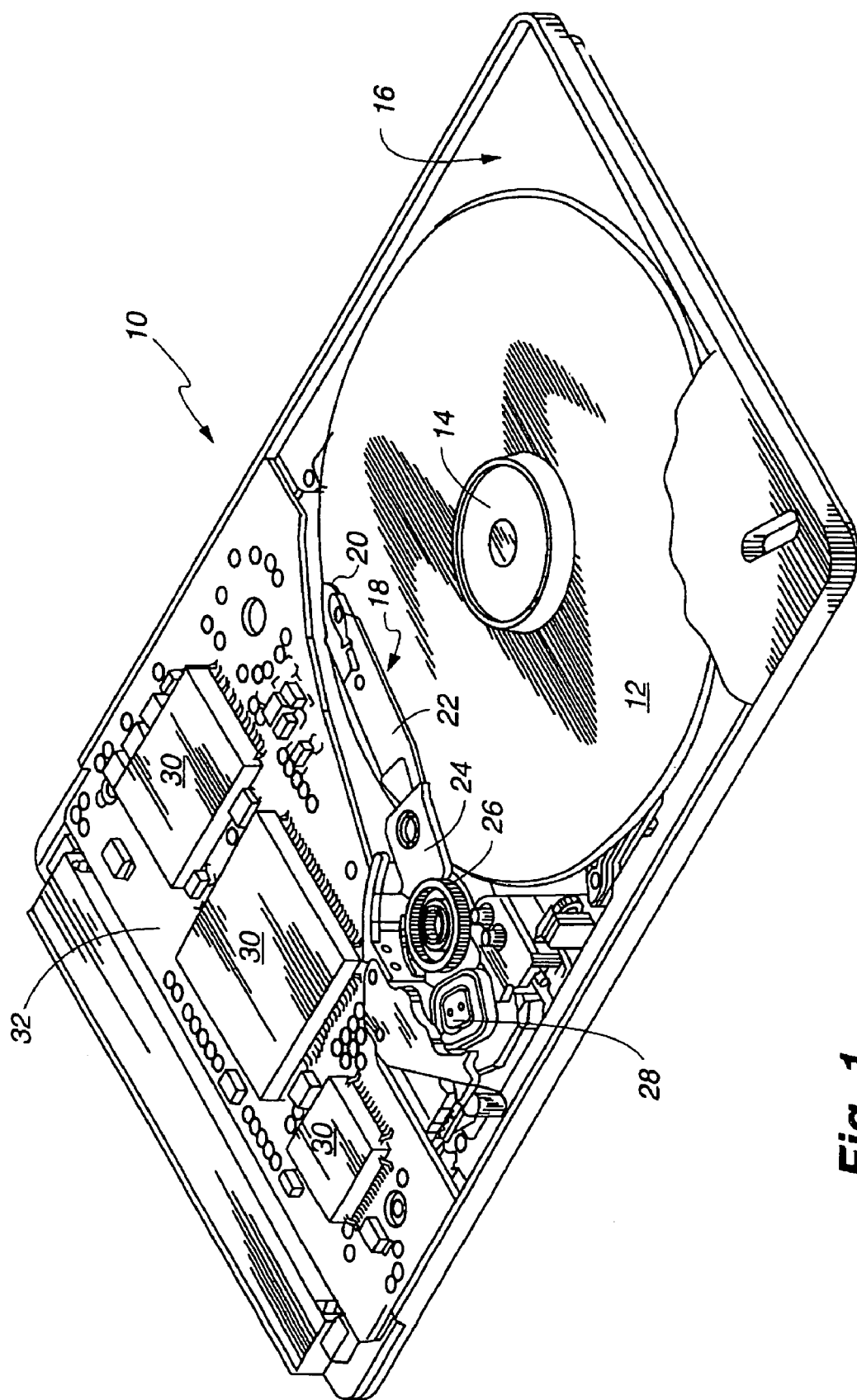
FIG. 1 illustrates a perspective view of a conventional disk drive.
Figure 2:
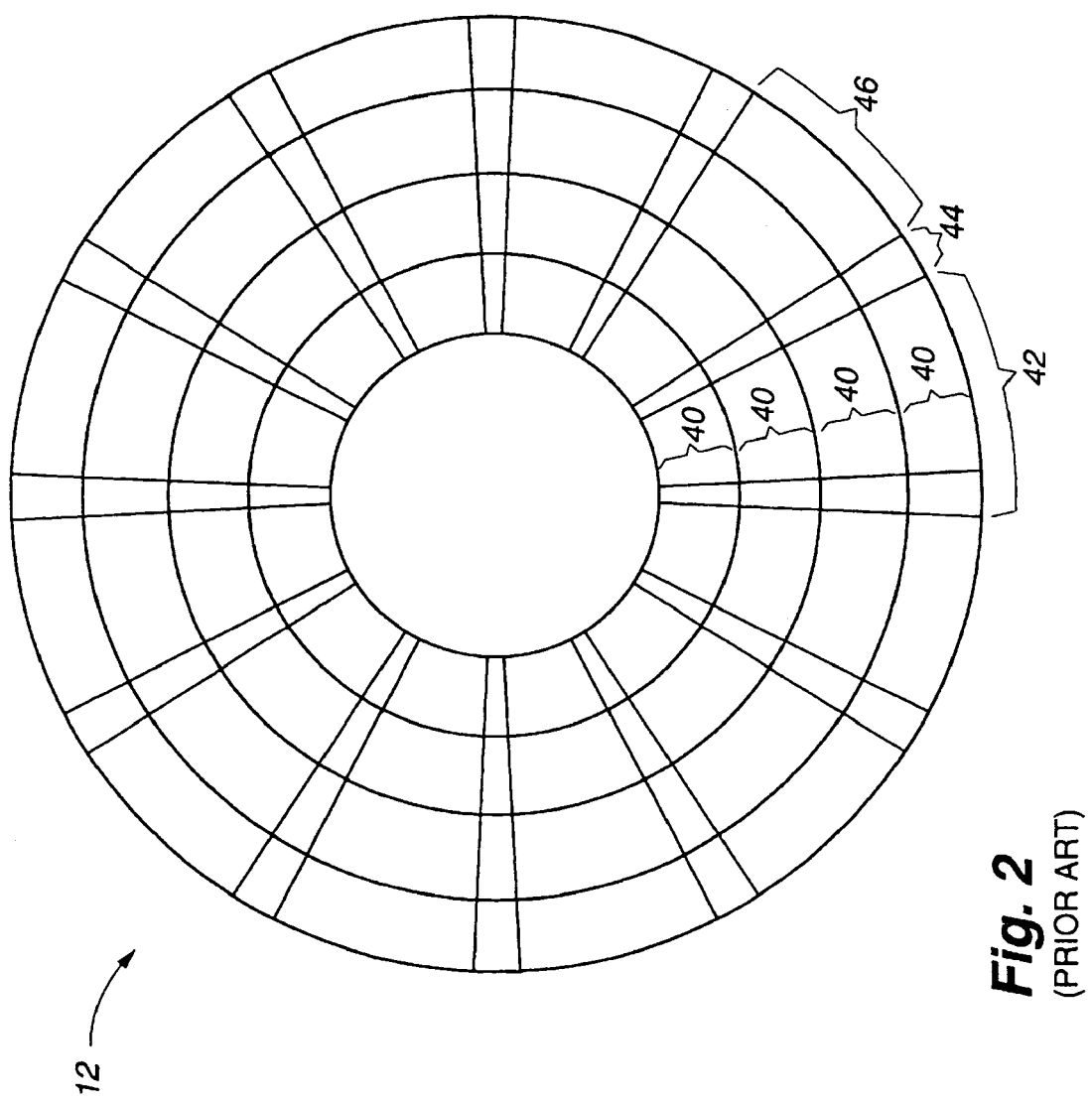
FIG. 2 illustrates a conventional storage disk having tracks and sectors, each of the sectors being divided into a servo region and a data region.
Figure 3:
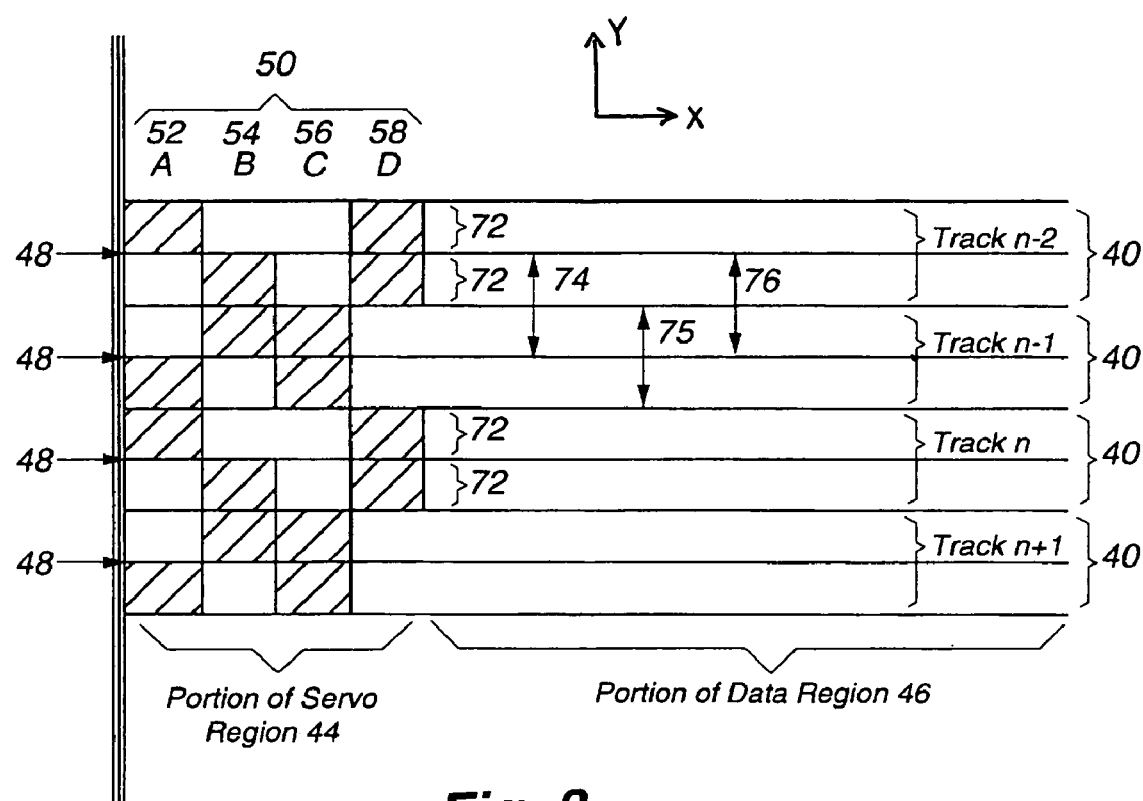
FIG. 3 illustrates portions of conventional tracks on a storage disk, and illustrates a relationship between servo track pitch and data track pitch.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. The size and relative sizes of features and regions in the drawings may be exaggerated for clarity.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein, the term "and/or" includes any and all combinations of one or more of the associated listed items.

The present invention may be embodied as apparatus, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 4:
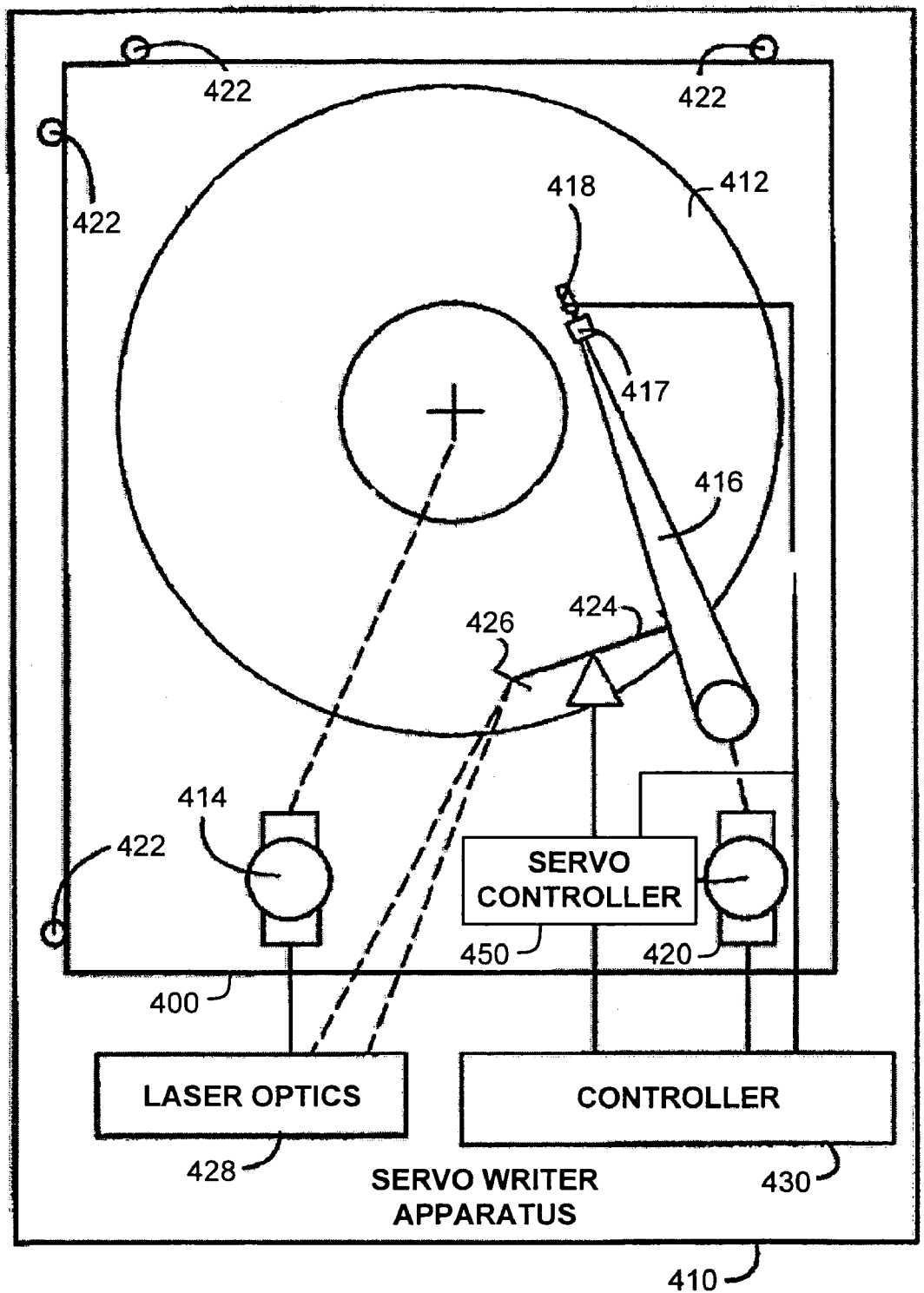
FIG. 4 is a block diagram illustrating a disk drive coupled to a servo track writer according to some embodiments of the present invention.

FIG. 4 shows a disk drive 400 apparatus that is mounted within a servo track writer (STW) 410 apparatus according to some embodiments of the present invention. The disk drive 400 includes at least one storage disk 412, a spin motor 414, an actuator arm 416, and a transducer 418 (i.e., head). The storage disk 412, the spin motor 414, the actuator arm 416, and the transducer 418 can be similar to the corresponding elements shown in FIG. 1. The disk 412 may be a magnetic disk, optical disk, or any other type of storage disk having at least one major surface configured to store data in concentric data tracks defined thereon. For purposes of illustration only, various embodiments of the present invention are described below in the context of a magnetic type of disk 412.

The disk 412 is rotated by the spin motor 414. The actuator arm 416 is coupled to the transducer 418, and is rotated by a voice coil motor (VCM) 420 to radially sweep the transducer 418 across the disk 412. A microactuator 417 may be coupled between the actuator arm 416 and transducer 418 and configured to move the transducer 418 more precisely than the VCM 420 alone. The transducer 418 may be a giant magneto-resistive head (GMR), or similar device, that is configured to write information to, and/or read information from, the storage disk 412. As used herein, "information" can include servo patterns and user data. The transducer 418 can be associated in a "flying" relationship adjacent to the data storage surface of the disk 17, where it is movable relative to, and over, the data storage surface in order to read/write information.

Figure 5:
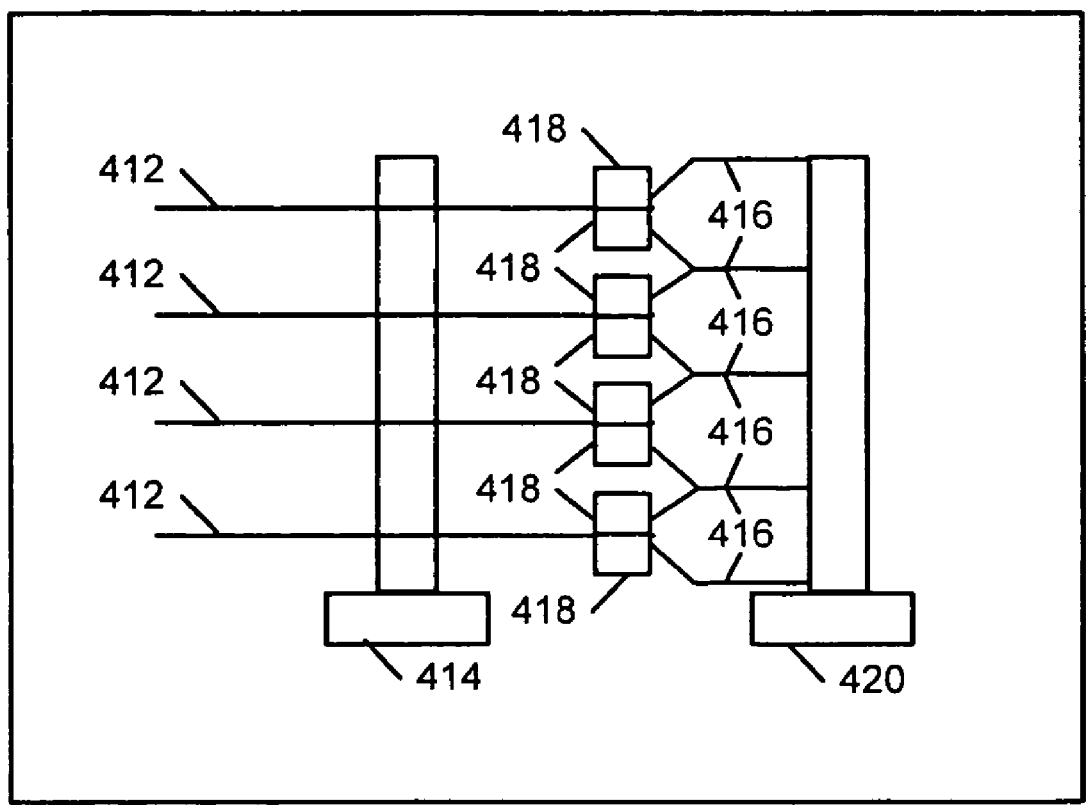
FIG. 5 illustrates a side diagrammatic view of a portion of the disk drive according to some embodiments of the present invention.

Although a single disk 412 is shown in FIG. 4, the disk drive 400 may include a plurality of disks and associated transducers. For example, FIG. 5 shows a side diagrammatic view of a portion of the disk drive 400 including a plurality of the disks 412, and with each of the disks 412 having two major surfaces configured to store data. The actuator arms 416 and connected to transducers 418 that are adjacent to respective ones of the recordable surfaces of the disks 412, and are configured to read and/or write data thereon.

With reference again to FIG. 4, the disk drive 400 is coupled to the STW 410 by alignment pins 422. The STW 410 is configured to move the actuator arm 416 while writing servo information at precise locations on the storage disk 412. The STW 410 includes a push-pin 424, a retro-reflector 426, a laser optics unit 428, and a controller 430. The push-pin 424 has an engagement end that engages the actuator arm 416 and another end coupled to the retro-reflector 426. The retro-reflector 426 reflects a laser beam back to a laser optics unit 428. The laser optics unit 428 may use conventional laser interferometry techniques to determine the precise relative location of the retro-reflector 426 relative to the reference pins 422 and, thereby, the precise relative radial location of the transducer 418 relative to the disk 412. The laser optics unit 428 provides the controller 430 with an indication of the radial location of the transducer 418 relative to the disk 412. The controller 430 moves the push-pin 424 and, thereby, the actuator arm 416 and transducer 418, based on the indication of the radial location of the transducer 418, and writes servo information through the transducer 418 at precisely determined locations on the disk 412. The servo information may be final product servo patterns or, in a self-servo writing process, intermediate servo patterns such as spiral patterns. Based on these intermediate servo patterns, final product servo pattern may be produced in the production process.

Figure 6:
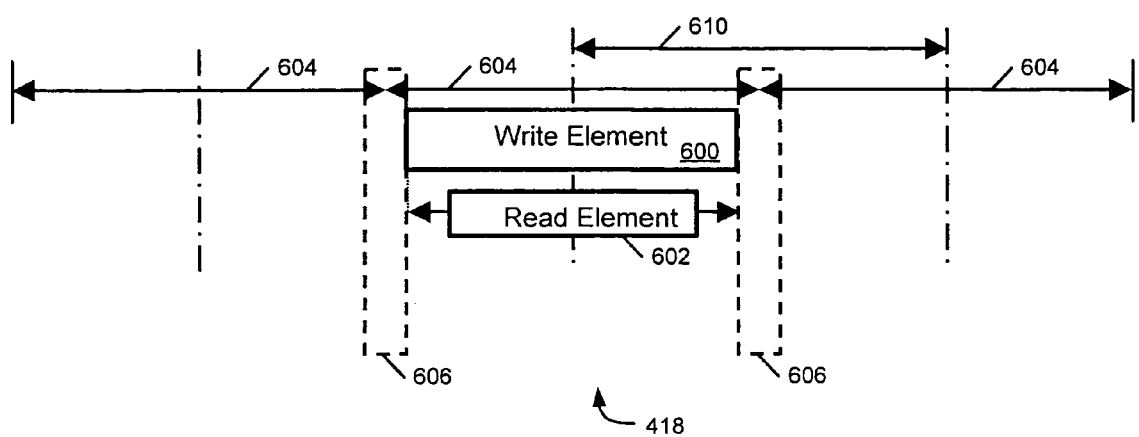
FIG. 6 illustrates the transducer adjacent to a recordable surface of the disk and aligned with one of a plurality of data tracks.

FIG. 6 is a diagrammatic illustration of the transducer 418 adjacent to a recordable surface of the disk 412 (FIG. 4) and aligned with one of a plurality of data tracks 604 in a data region. The transducer 418 includes a read element 602 and a write element 600. The write element 600 is configured to write the data tracks 604 on the disk 412. Also illustrated are guard bands 606, which can correspond to track misregistration (e.g., positioning error) of the write element 600 while writing. The data tracks 604 have been written with a data track pitch 610.

According to some embodiments of the present invention, the controller 430 is configured to determine a width of the write element 600, to determine the data track pitch 610 based on the determined write element 600 width, and to write the data tracks 604 with the write element 600 based on the determined data track pitch 610. The controller 430 can repeat the determination of write element width, determining a data track pitch based thereon, and writing the data tracks with the determined data track pitch for each of the transducers and adjacent major recordable surfaces of the disk(s) in the disk drive 400. Accordingly, data track pitch can be adjusted, and may be optimized, for each major recordable surface of the disk(s) based on the write element widths of the transducers. The data track pitch may thereby vary for each the recordable surfaces of the disk(s) based on variations in (e.g., in proportion to) the widths of the write elements that are adjacent thereto.

Figure 7:
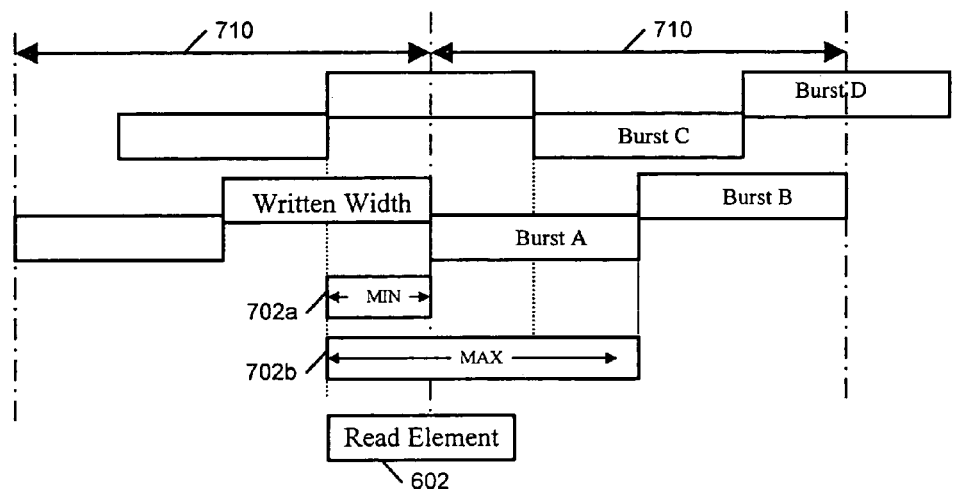
FIG. 7 illustrates the read element adjacent to a recordable surface of the disk and servo bursts thereon, according to some embodiments of the present invention.

FIG. 7 is a diagrammatic illustration of a plurality of servo bursts written in servo tracks with a servo track pitch 710, and the read element 602. According to some embodiments of the present invention, the controller 430 is configured to determine a width of the read element 602, to determine the servo track pitch 710 based on the determined read element 602 width, and to write the servo bursts and tracks with the write element 600 based on the determined servo track pitch 710. The controller 430 can repeat the determination of read element width, determining servo track pitch based thereon, and writing the servo tracks with the determined servo track pitch for each of the transducers and adjacent major recordable surfaces of the disk(s) in the disk drive 400. Accordingly, servo track pitch can be adjusted, and may be optimized, for each major recordable surface of the disk(s) based on the read element widths of the transducers. The servo track pitch may thereby vary for each the recordable surfaces of the disk(s) based on variations in (e.g., in proportion to) the widths of the read elements that are adjacent thereto.

For example, with reference to FIG. 5, the controller 430 may determine the width of the write elements and the read elements in each of the transducers 418. The controller 430 may then determine the servo track pitch for each of the major recordable surfaces of each of the disks 412 based on the determined read element width of the adjacent one of the transducers 418. The controller 430 may determine the data track pitch for each of the major recordable surfaces of each of the disks 412 based on the determined write element width of the adjacent one of the transducers 418. Accordingly, the servo track pitch and the data track pitch for each of the major recordable surfaces of each of the disks 412 is proportional to the respective widths of the read element and the write element of the adjacent one of the transducers 418, and can vary from one to another of the disks 412.

Accordingly, more variability in head geometry (i.e., variation in widths of read and write elements of transducers in a disk drive) may be accommodated and compensated, such that head manufacturing yield may be increased and/or the operation and/or performance of the disk drive may be improved.

With reference to FIGS. 6 and 7, the width of the read element 602 should be sufficient to generate a threshold read signal level when reading the servo bursts and data. The write element 600 should be wider than the read element 602, and sufficient to generate the guard bands 606 to reduce or eliminate previously written data from being read by the read element 602. The write element 600 should also be narrower than the desired data track pitch 610. For the 4-burst quadrature pattern (without anti-phase bursts, where phase of radially-adjacent bursts is reversed) that is shown in FIG. 6, the read element 602 width should be between about 0.5 (shown as MIN 702a) and about 1.5 (shown as MAX 702b) times the width of each of the servo bursts, and may preferably be equal to about the width of each of the servo bursts, so as to avoid potential positioning uncertainty when the servo bursts are read. As shown in FIG. 7, each of the servo bursts may have half the width of the servo track pitch 710. The write element 600 should be at least as wide as each of the servo bursts.

By way of example, the transducer 418 is positioned based on servo position information that is generated based on the amplitude of the read signal from the read element 602 reading the servo bursts. The amplitude of the read signal varies based on how much of the read element 602 passes over each servo burst. When the read element 602 width is less than half the width of the servo bursts, then in some positions the read element 602 does not pass over an edge of the servo bursts, which can cause the servo position information to not vary with position. Such loss of position information may also occur when the read element 602 width is more than about 1.5 times the width of the servo bursts.

Figure 8:
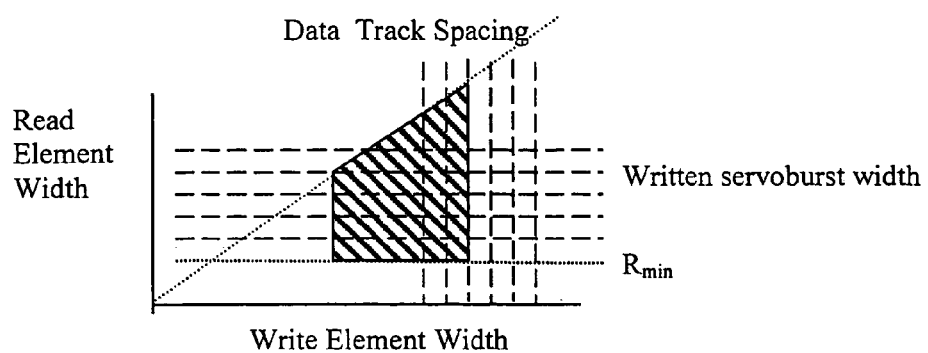
FIG. 8 is a graph that illustrates a range of servo track pitch and data track pitch according to some embodiments of the present invention.

The widths of the read element 602 and the write element 600 can be compatible with a range of servo track and data track pitches. Conversely, for a given servo track pitch and data track pitch, a range of read element 602 and write element 600 widths can be tolerated, which is illustrated by the exemplary graph of FIG. 8. Traditionally, specific servo track and data track pitches are selected for a product, and manufacturing tolerances are then established therefrom for how much variation in read/write element widths may be tolerated for remaining within the region indicated by the graph of FIG. 8. According to various embodiments of the present invention, such constraints may be reduced by adapting track pitch to the particular sensed widths of individual read/write elements.

According to some embodiments of the present invention, the controller 430 is configured to determine a width of the read element 602 by using a spiral pattern on the disk 412, reading at least a portion of the spiral pattern with the read element 602 to generate a read signal envelope, and determining the width of the read element 602 based on the read signal envelope. In some further embodiments of the present invention, the controller 430 is configured to determine the width of the write element 600 based on the read signal envelope.

Figure 9:
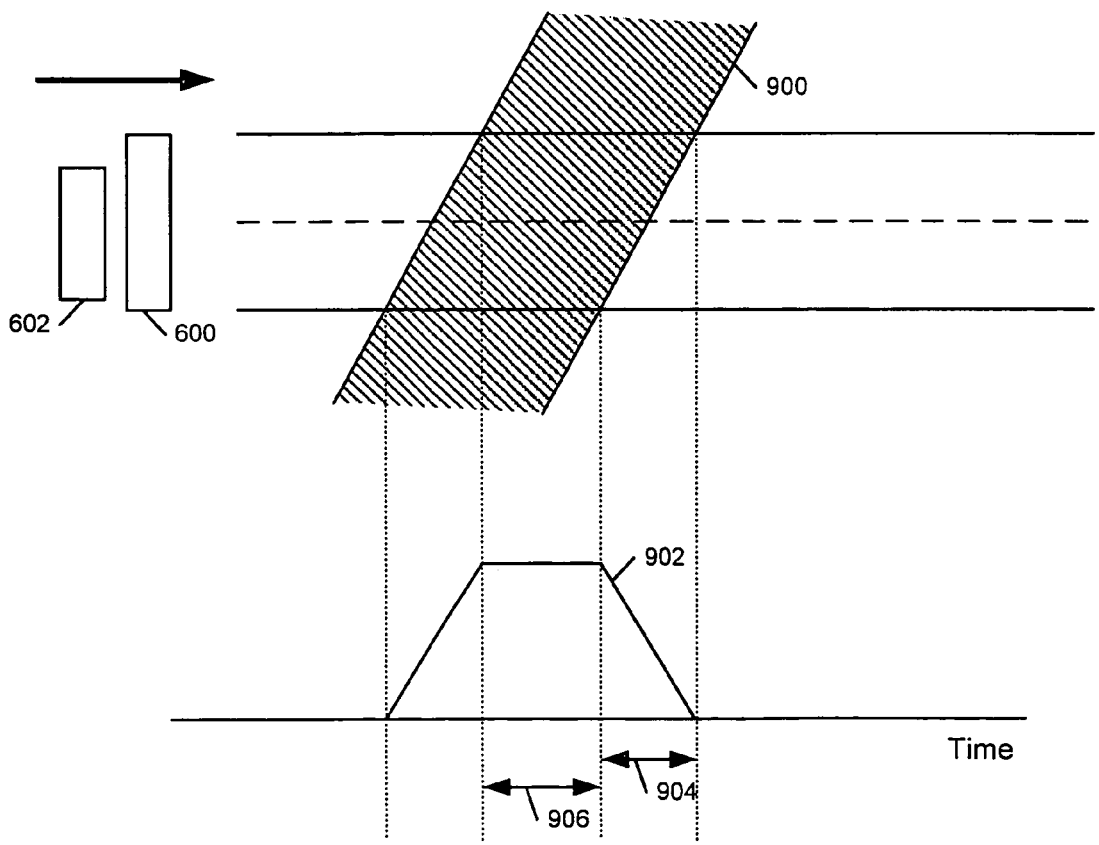
FIG. 9 illustrates a spiral track that is used to determine width of the read element and width of the write element according to some embodiments of the present invention.

FIG. 9 illustrates an exemplary embodiment of a spiral pattern 900 and an idealized illustration of a read signal envelope 902. The controller 430 may form the spiral pattern 900 by writing a pattern on the disk 412 at a known slew rate, such as by writing the pattern while moving the write element 600 with a known radial velocity. The slew rate may be determined based on a known rotational velocity of the disk 412 and the radial velocity of the write element 600. The spiral pattern 900 may be a straight or arcuate pattern that extends radially and circumferentially away/toward an inner diameter of the disk 412 (i.e., slanted relative to the path of the read element 602).

The width of the read element 602 can be determined based on the slew rate of the spiral pattern 900 and based on an elapsed time between two values in the read signal envelope 902 that satisfy a predetermined relationship. For example, the width of the read element 602 can be determined based on the elapsed time for the read signal envelope 902 to transition from a peak value to a minimum value, i.e., elapsed time 904. The read element 602 width may then be determined by multiplying the slew rate times the elapsed time 904.

The width of the write element 600 may be similarly determined based on the slew rate of the spiral pattern 900 and based on an elapsed time between two values in the read signal envelope 902 that satisfy a predetermined relationship. For example, the width of the write element 600 can be determined based on the elapsed time for which the read signal envelope 902 maintains at least a predetermine value, such as half of the average maximum value. Accordingly, the write element 600 width may be determined by multiplying the slew rate times the sum of the elapsed time 906 and the elapsed time 904 of the rising portion or of the falling portion of the read signal envelope 902 (i.e., elapsed time over which the read signal envelope 902 is at least half of the average maximum value).

Figure 10:
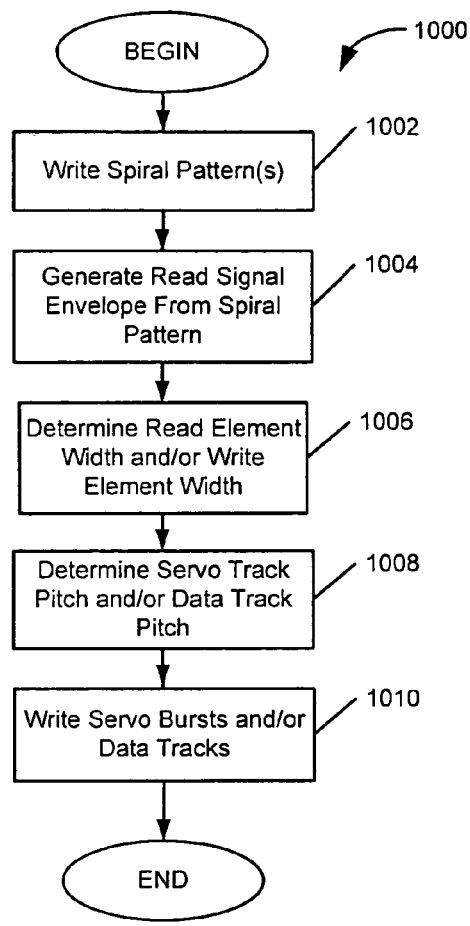
FIG. 10 is a flowchart of operations for determining width of the read element and width of the write element using a spiral track according to some embodiments of the present invention.

FIG. 10 is a flowchart of operations in a process 1000 that may be performed by the controller 430 to determine a width of the read element 602 and/or the write element 600. At Block 1002, one or more spiral patterns are written on the disk 412 using the write element 600. At Block 1004, a read signal envelope is generated by reading at least a portion of the spiral pattern(s) using the read element 602. At Block 1006, a width of the read element 602 and/or a width of the write element 600 is determined based on the read signal envelope. At Block 1008, a servo track pitch is determined based on the determined read element 602 width and/or a data track pitch is determined based on the determined write element 600 width. The servo track pitch and/or the data track pitch may be determined by adjust a predetermined track pitch. The predetermined track pitch may be based on expected widths of the read and/or write elements 602 and 600 (i.e., expected head geometry based on the manufacturing processes). At Block 1010, servo bursts are written in servo tracks on the disk with the write element 600 based on the determined servo track pitch and/or data tracks are written on the disk 412 with the write element based on the determined data track pitch.

The data track pitch may be adjusted (e.g., optimized) before writing final data tracks on the disk 412. For example, the data patterns may be written with the write element 600 in a plurality of adjacent data tracks on the disk 412 based on the determined data track pitch. At least a portion of the written data patterns can then be read using the read element 602 to generate read data. The bit error rate and/or the off-track read capability of the read element 602 can be determined based on the read data. The data track pitch may then be adjusted based on the determined bit error rate and/or the off-track track read capability. Adjustment of the data track pitch may allow reduction of the bit error rate and/or improvement of the off-track read capability. The adjusted data track pitch may then be used to write adjacent data tracks on the disk 412.

Figure 11:
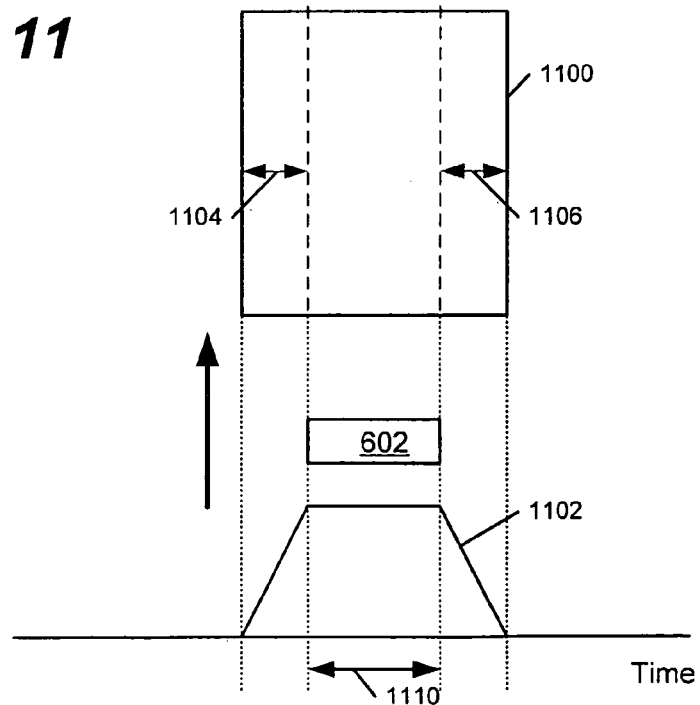
FIG. 11 illustrates a trimmed burst mark that is used to determine width of the read element according to some embodiments of the present invention.

According to some embodiments of the present invention, the controller 430 is configured to determine a width of the read element 602 by writing a burst mark on the disk 412 with the write element 600 (FIG. 7), to trim a portion of the burst mark with the write element 600 (FIG. 7), to read the trimmed burst mark with the read element 602 to generate a read signal envelope, and to determine the width of the read element 602 based on the read signal envelope. FIG. 11 illustrates an exemplary embodiment of a burst mark 1100 and an idealized illustration of a read signal envelope 1102. When the burst mark 1100 is written on the disk 412, it should be about the width of the write element 600 (FIG. 7). The controller 430 then trims the burst mark 1100 by an amount 1104 to reduce its width, such as by stepping the write element 600 (FIG. 7) while writing a DC pattern. The controller 430 then reads the trimmed burst mark 1100 to generate a read signal envelope, and determines the width of the read element 602 based on the read signal envelope.

The controller 430 may repetitively trim further portions of the burst mark 1100, such as portion 1106, to further reduce the width of the trimmed burst mark 1100, and then generate a read signal envelope based on the further trimmed burst mark 1100. The controller 430 may continue to repetitively trim the burst mark 1100 and generate a read signal envelope therefrom until, for example, a peak value of the read signal envelope decreases a threshold amount (e.g., a threshold decrease from a peak value of a previous read signal envelope), which indicates that the width of the trimmed burst mark 1100 has become less than the read element 602. As shown in FIG. 11, a width 1110 of the read element 602 may be determined based on a width of a portion of the read signal envelope 1102 that exceeds a predetermined value, (e.g., width of the average maximum value of the read signal envelope 1102), which indicates that the read element 602 covers the trimmed burst mark 1100.

Figure 12:
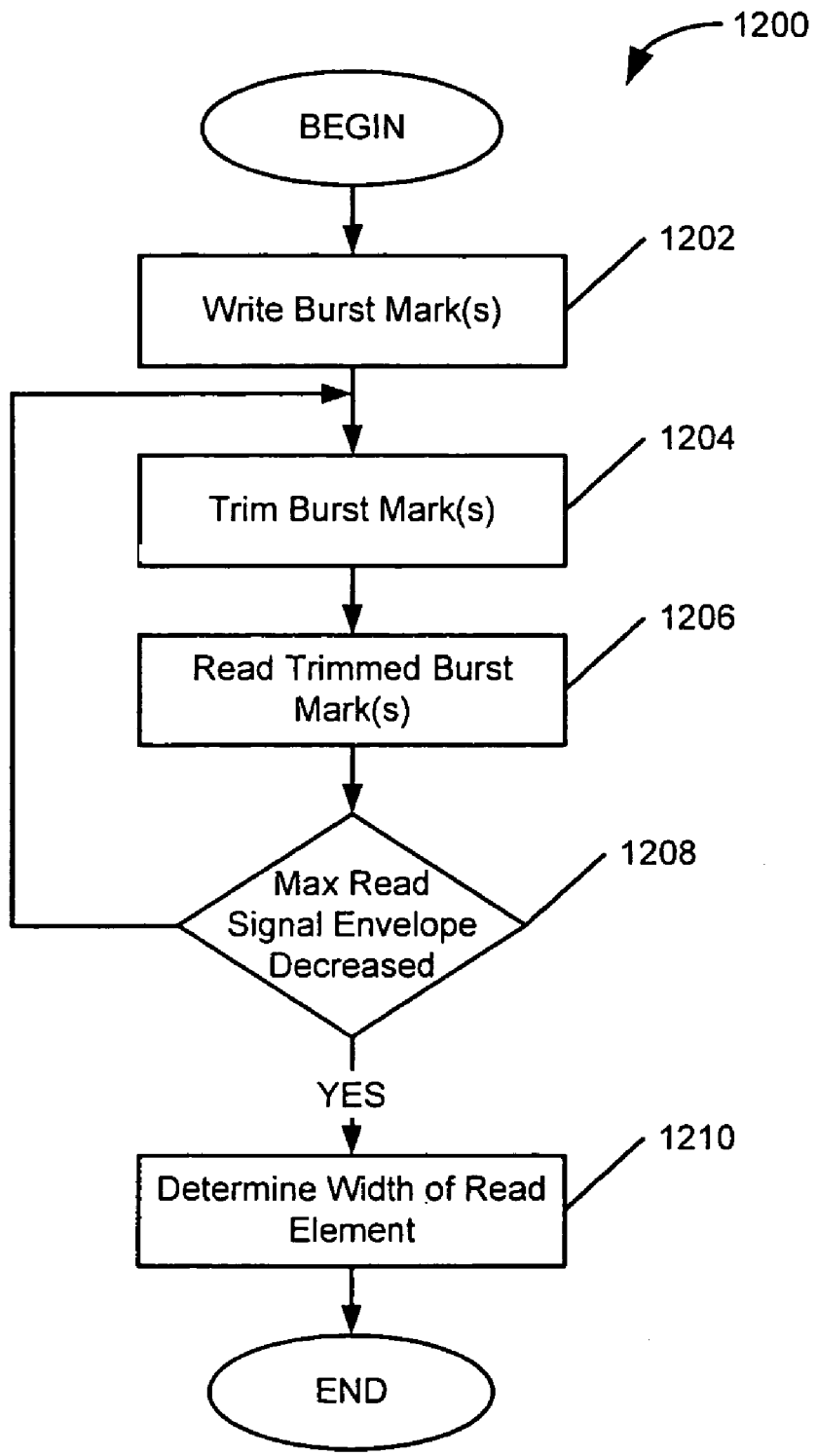
FIG. 12 is a flowchart of operations for determining width of the read element using a trimmed burst mark according to some embodiments of the present invention.

FIG. 12 is a flowchart of operations in a process 1200 that may be performed by the controller 430 to determine a width of the read element 602. At Block 1202, at least one burst mark is written on the disk 412. At Block 1204, the burst mark is trimmed. At Block 1206, the trimmed burst mark is read to generate a read signal envelope. At Block 1208, a decision is made as to whether the peak/average maximum value of the read signal envelope has decreased a threshold amount (i.e., indicating the width of the burst mark has become less than the width of the read element 602). If the decision at Block 1208 is that the peak/average maximum value of the read signal envelope has not decreased the threshold amount, then the trimming process can continue from Block 1204, or if the decision at Block 1208 is contrary, then at Block 1210 the width of the read element 602 is determined based on the read signal envelope.

Although the processes 1000 and 1200 and some of the other operations and actions for determining the width of read and write elements and for determining servo track pitch and data track pitch have been described as being carried out by the controller 430 within the servo track writer 410, it is to be understood that according to some other embodiments of the present invention, at least a portion of the processes, operations, and/or actions that have been attributed to the controller 430, may be alternatively, or additionally, carried out at least in part by the controller 450 in the disk drive 400. For example, the controller 450 may be configured to perform at least a part of a self-servo operation for the disk drive 400. The disk drive 400 may thereby perform a self-servo operation at least partially independent of the servo track writer 410. To perform a self-servo writing operation that includes at least a part of processes 1000 and/or 1200, the disk drive 400 may include additional components such as those shown in FIG. 1. For example, the disk drive 400 may further include the electronic circuits 30, and circuitry therein, including a data controller, read write channel, and servo controller, to determine the radial location of the transducer 418 relative to the disk 412, to position the transducer 418 based the determined location and a desired location, and to write servo bursts and data on the disk 412.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of making a disk drive that includes a disk and a transducer adjacent to the disk, the transducer including a read element and a write element, the method comprising:
   determining a width of the read element;
   determining a servo track pitch based on the read element width; and
   writing servo bursts in servo tracks on the disk with the write element based on the servo track pitch, wherein determining a width of the read element comprises:
   writing a spiral pattern on the disk with the write element;
   reading at least a portion of the spiral pattern with the read element to generate a read signal envelope; and
   determining the read element width based on the read signal envelope.

2. The method of claim 1, wherein:
   writing a spiral pattern on the disk comprises writing the spiral pattern at a slew rate; and
   the read element width is determined based on the slew rate and based on an elapsed time between two values in the read signal envelope that satisfy a predetermined relationship.

3. The method of claim 2, wherein the read element width is determined based on the slew rate and based on an elapsed time between a peak value and a minimum value in the read signal envelope.

4. A method of making a disk drive that includes a disk and a transducer adjacent to the disk, the transducer including a read element and a write element, the method comprising:
   determining a width of the read element;
   determining a servo track pitch based on the read element width;
   writing servo bursts in servo tracks on the disk with the write element based on the servo track pitch;
   determining a width of the write element;
   determining a data track pitch based on the write element width; and
   writing data tracks on the disk with the write element based on the data track pitch, wherein determining a width of the write element comprises:
   writing a spiral pattern on the disk with the write element;
   reading at least a portion of the spiral pattern with the read element to generate a read signal envelope; and
   determining the write element width based on the read signal envelope.

5. The method of claim 4, wherein:
   writing a spiral pattern on the disk comprise writing the spiral pattern at a slew rate; and
   determining the write element width comprises determining the write element width based on the slew rate and based on an elapsed time between two values in the read signal envelope that satisfy a predetermined relationship.

6. The method of claim 4, wherein writing data tracks on the disk based on the write element width comprises:
   writing data patterns with the write element in a plurality of adjacent data tracks on the disk based on the data track pitch;
   reading with the read element at least a portion of the data patterns to generate read data;
   determining a bit error rate based on the read data;
   adjusting the data track pitch based on the bit error rate; and
   writing a plurality of adjacent data tracks on the disk based on the adjusted data track pitch.

7. The method of claim 4, wherein writing data tracks on the disk based on the write element width comprises:
   writing data patterns with the write element in a plurality of adjacent data tracks on the disk based on the data track pitch;
   reading with the read element at least a portion of the data patterns to generate read data;
   determining an off-track read capability based on the read data;
   adjusting the data track pitch based on the off-track read capability; and
   writing a plurality of adjacent data tracks on the disk based on the adjusted data track pitch.

8. A method of making a disk drive that includes a disk and a transducer adjacent to the disk, the transducer including a read element and a write element, the method comprising:
   determining a width of the read element;
   determining a servo track pitch based on the read element width; and
   writing servo bursts in servo tracks on the disk with the write element based on the servo track pitch, wherein determining a width of the read element comprises:
   writing a burst mark on the disk with the write element;
   trimming a portion of the burst mark with the write element;
   reading the trimmed burst mark with the read element to generate a read signal envelope; and
   determining the read element width based on the read signal envelope.

9. The method of claim 8, further comprising:
   determining a position of the transducer while writing the burst mark;
   determining a position of the transducer while reading the trimmed burst mark; and
   determining the read element width based on the read signal envelope and based on the determined positions of the transducer while writing the burst mark and while reading the trimmed burst mark.

10. The method of claim 8, further comprising repeating the trimming a portion of the burst mark, reading the trimmed burst mark, and determining the read element width until a peak value of the read signal envelope decreases a threshold amount from a previously generated read signal envelope.

11. An apparatus for writing servo bursts on a disk, the apparatus comprising:
   a transducer having a read element and a write element; and
   a controller that is configured to determine a width of the read element, configured to determine a servo track pitch based on the read element width, configured to write servo bursts in a servo tracks on the disk based on the servo track pitch, configured to write a spiral pattern on the disk with the write element, configured to read at least a portion of the spiral pattern with the read element to generate a read signal envelope, and configured to determine the read element width based on the read signal envelope.

12. The apparatus of claim 11, wherein the controller comprises a servo track writer controller.

13. The apparatus of claim 11, wherein the controller comprises a disk drive controller.

14. The apparatus of claim 11, wherein the controller is configured to write the spiral pattern at a slew rate, and configured to determine the read element width based on the slew rate and based on an elapsed time between two values in the read signal envelope that satisfy a predetermined relationship.

15. The apparatus of claim 14, wherein the controller is configured to determine the read element width based on the slew rate and based on an elapsed time between a peak value and a minimum value in the read signal envelope.

16. An apparatus for writing servo bursts on a disk, the apparatus comprising:
   a transducer having a read element and a write element; and
   a controller that is configured to determine a width of the read element, configured to determine a servo track pitch based on the read element width, configured to write servo bursts in a servo tracks on the disk based on the servo track pitch, configured to determine a width of the write element, configured to determine a data track pitch based on the write element width, and configured to write data tracks on the disk with the write element based on the data track pitch,
   wherein the controller is configured to write a spiral pattern on the disk with the write element, configured to read at least a portion of the spiral pattern with the read element to generate a read signal envelope, and configured to determine the write element width based on the read signal envelope.

17. The apparatus of claim 16, wherein the controller is configured to write data patterns with the write element in a plurality of adjacent data tracks on the disk based on the data track pitch, configured to read with the read element at least a portion of the data patterns to generate read data, configured to determine a bit error rate based on the read data, configured to adjust the data track pitch based on the bit error rate, and configured to write a plurality of adjacent data tracks on the disk based on the adjusted data track pitch.

18. An apparatus for writing servo bursts on a disk, the apparatus comprising:
   a transducer having a read element and a write element; and
   a controller that is configured to determine a width of the read element, configured to determine a servo track pitch based on the read element width, configured to write servo bursts in a servo tracks on the disk based on the servo track pitch, configured to determine a width of the write element, configured to determine a data track pitch based on the write element width, and configured to write data tracks on the disk with the write element based on the data track pitch, wherein the controller is configured to write the spiral pattern on the disk at a slew rate, and configured to determine the write element width based on the slew rate and based on an elapsed time between two values in the read signal envelope that satisfy a predetermined relationship.

19. An apparatus for writing servo bursts on a disk, the apparatus comprising:
a transducer having a read element and a write element; and
a controller that is configured to determine a width of the read element, configured to determine a servo track pitch based on the read element width, configured to write servo bursts in a servo tracks on the disk based on the servo track pitch, configured to write a burst mark on the disk with the write element, configured to trim a portion of the servo burst with the write element, configured to read the trimmed servo burst with the read element to generate a read signal envelope, and configured to determine the read element width based on the read signal envelope.

20. The apparatus of claim 19, wherein the controller is configured to determine a position of the transducer while writing the burst mark, configured to determine a position of the transducer while reading the trimmed burst mark, and configured to determine the read element width based on the read signal envelope and based on the determined positions of the transducer while writing the burst mark and while reading the trimmed burst mark.

21. The apparatus of claim 20, wherein the controller is configured to repeat the trimming a portion of the burst mark, reading the trimmed burst mark, and determining the read element width until a peals value of the read signal envelope decreases a threshold amount from a previously generated read signal envelope.

* * * * *